(12) United States Patent
Ridel et al.

(10) Patent No.: US 10,150,219 B2
(45) Date of Patent: Dec. 11, 2018

(54) GRIPPER DEVICE AND A PACKING SYSTEM INCLUDING SUCH A GRIPPER DEVICE

(71) Applicant: Marel A/S, Aarhus N. (DK)

(72) Inventors: Jack William Ridel, Norwich (GB); Ben James Wilson Findlay, Norwich (GB)

(73) Assignee: MAREL A/S, Aarhus N. (DK)

( * ) Notice: Subject to any disclaimer, the term of this patent is extended or adjusted under 35 U.S.C. 154(b) by 340 days.

(21) Appl. No.: 15/119,002

(22) PCT Filed: Feb. 13, 2015

(86) PCT No.: PCT/GB2015/050411
§ 371 (c)(1),
(2) Date: Aug. 15, 2016

(87) PCT Pub. No.: WO2015/121668
PCT Pub. Date: Aug. 20, 2015

(65) Prior Publication Data
US 2016/0361824 A1   Dec. 15, 2016

(30) Foreign Application Priority Data

Feb. 14, 2014  (EP) .................................. 14155154

(51) Int. Cl.
*B25J 15/06*  (2006.01)
*B25J 11/00*  (2006.01)
(Continued)

(52) U.S. Cl.
CPC ....... *B25J 15/0616* (2013.01); *B25J 11/0045* (2013.01); *B25J 15/0061* (2013.01);
(Continued)

(58) Field of Classification Search
CPC .................................................. B25J 15/0616
(Continued)

(56) References Cited

U.S. PATENT DOCUMENTS

| 6,374,984 B1 | 4/2002 | Nagler |
| 8,594,833 B2 | 11/2013 | Goodman et al. |
| 2013/0004286 A1 | 1/2013 | Hafner et al. |

FOREIGN PATENT DOCUMENTS

| DE | 19820537 A1 | 11/1999 |
| EP | 1396313 A1 | 3/2004 |

(Continued)

OTHER PUBLICATIONS

PCT International Search Report; International Application No. PCT/GB2015/050411; Date of Actual Completion of International Search: Jul. 6, 2016; International Search Report:P dated Jul. 20, 2015.

*Primary Examiner* — Lori Baker
(74) *Attorney, Agent, or Firm* — Pearne & Gordon LLP (57) ABSTRACT

Provided is a gripper device to pick up items, such as sausages, from a first position with the items in a side by side arrangement, to a second position where the items are released. Provided are a plurality of side by side and spaced apart item holders each adapted to the shape of the items configured for picking up the side by side items and having a pitch distance between adjacent item holders substantially the same as the pitch distance between adjacent items at the first position. A pitch distance adjustment mechanism is provided to adjust the pitch distance between adjacent spaced apart item holders to arrange the received items into a group of items, before release at the second position.

15 Claims, 10 Drawing Sheets

(51) Int. Cl.
    *B25J 15/00*     (2006.01)
    *B65B 5/06*     (2006.01)
    *B65B 25/06*     (2006.01)
    *B65B 35/36*     (2006.01)

(52) U.S. Cl.
    CPC ............ *B65B 5/068* (2013.01); *B65B 25/065* (2013.01); *B65B 35/36* (2013.01)

(58) Field of Classification Search
    USPC .......................................................... 53/448
    See application file for complete search history.

(56) References Cited

FOREIGN PATENT DOCUMENTS

| | | |
|---|---|---|
| EP | 2192063 A1 | 6/2010 |
| FR | 2974573 A1 | 11/2012 |
| GB | 2436100 A | 9/2007 |
| JP | 2011025392 A | 2/2011 |
| WO | 2014197828 A2 | 12/2014 |

GRIPPER DEVICE AND A PACKING SYSTEM INCLUDING SUCH A GRIPPER DEVICE

CROSS-REFERENCE TO RELATED APPLICATIONS

This application is the national phase of International Application No. PCT/GB2015/050411 filed on Feb. 13, 2015, which claims the benefit of priority to European Patent Application No. 14155154.9 filed on Feb. 14, 2014. The entire disclosures thereof are incorporated herein by reference.

FIELD OF THE INVENTION

The present invention relates to a gripper device for picking up parallel elongated items, such as sausages, at a first position where the items are arranged in a side by side arrangement, and releasing them at a second position.

BACKGROUND OF THE INVENTION

GB 2 436 100 discloses a pick and place gripper device comprising a plurality of item-gripping means adapted to pick up individual items one at a time. This pick and place gripper device is in particular adapted to be used for picking randomly positioned items of product from a conveyor and placing the picked up items in groups in a receptacle such as a tray or box or thermoform pouch.

The fact that one item is picked up at a time makes this pick and place gripper inefficient, particularly when producing groups from a large amount of incoming items such as sausages.

SUMMARY OF THE INVENTION

On the above background it is an object of embodiments of the present invention to provide a gripper device that has higher throughput and that is capable of picking up a plurality of incoming items and even produce more than one group of items simultaneously.

Embodiments of the invention preferably seek to mitigate, alleviate or eliminate the above-mentioned disadvantage. In particular, it may be seen as an object of embodiments of the present invention to provide a gripper device that solves the above mentioned problems, or other problem, of the prior art.

To address one or more of these concerns, in a first aspect of the invention a gripper device is for picking up items from a first position where the items are arranged in a side by side arrangement, and releasing the items at a second position, wherein the gripper device comprises:
  a plurality of side by side arranged and spaced apart item holders, where each of the item holders comprises a pick-up arrangement for picking up an item, the spaced apart item holders being configurable such that the pitch distance between adjacent item holders, prior to picking up the items, is substantially the same as the pitch distance between adjacent items at the first position, and
  a pitch distance adjustment mechanism adapted to, subsequent to picking up the items from the first position, adjust the pitch distance between adjacent spaced apart item holders so as to arrange the received items into at least one group of items by altering the pitch distance within each of the at least one group of items before the at least one group is released at the second position.

Accordingly, a high throughput gripper device is provided that is capable of picking up a plurality of items, e.g. sausages, and release them into e.g. trays at the second position at e.g. a packing station. More importantly, it is possible to create a plurality of portions (a portion consisting of a group of items) simultaneously instead of producing one portion at a time. This means that the production speed may be multiplied compared to conventional gripper devices.

The altering of the pitch distance may in one embodiment comprise increasing the pitch distance between adjacent items before the at least one group is released at the second position. As an example, the items may be food items such as poultry meat, e.g. chicken breasts, where the pitch distance of the items within the one or more group of the food items is increased before being placed at the second position, which may e.g. be any type of tray and the like. It may be preferred to put such food items into the tray (or any type of packing) such that they are at least partly spaced apart in the trays.

In one embodiment, altering the pitch distance within each of the at least one group of items comprises reducing the pitch distance of the items within the at least one group.

As an example, 20 sausages may be simultaneously picked up, where prior to releasing them into e.g. trays, gripper device is capable of splitting these 20 sausages into four groups/portions of five sausages. These may subsequently be released into four separate trays.

It should be noted that the items may be any types of food items or non-food items. They may be items with a substantially transverse circular cross-section such as sausages, cucumber, etc. For items having such a cross-sectional shape, a preferred cross-sectional shape of item engaging surfaces defined by the item holders may be a concave-like cross-section.

The side by side arranged items may include parallel straight elongated items, such as sausages, where the longitudinal axes of the items are parallel. In such a scenario it may be preferred that the item holders are arranged parallel to each other with parallel longitudinal axes.

The side by side arranged items may also include partly curved items, e.g. curved sausages. In such instances, it may be preferred that the item holders are shaped, in the longitudinal way, in substantially the same way as the items to be picked up. This does however not necessarily have to be the case.

The means for picking the side by side items up may comprise any type of suction mechanism, e.g. a one comprising one or more suction cups and the like for supplying an attraction force on the items to be picked up.

The term pitch distance may according to the present invention be understood as a reference distance between adjacent items and adjacent holders. This may as an example be the distance between a central axis of the adjacent items and adjacent item holders, or the distance between the sides of adjacent items and adjacent item holders.

Accordingly, if the items are sausages and the item holders are elongated item holders, for example, this should be understood as e.g. the distance between the longitudinal axis of adjacent item holders and the distance between the longitudinal axis of adjacent sausages.

In embodiments, the dimensions of the side by side arranged and spaced apart item holders are selected such that they have substantially the same dimensions as the dimensions of the items to be picked up (at least in plan view from above, with the items resting on support surface and the holders oriented to pick up the items). Thus, the empty space between the items in the item holders is minimized and the risk that the items may fall out of the item holders prior to the release of the items is reduced.

In one embodiment, the pitch distance adjustment mechanism is selected from:
- at least one pneumatic cylinder, or
- an electric motor, or
- an electric actuator, or
- a mechanical coupling between individual item holders, or
- a combination of one or more of the above.

In preferred embodiments, the device is configured to use the Venturi effect to reduce the pressure within at least one port defined by the pick-up arrangement, the at least one port being used to pick up an item. This approach facilitates provision of a fast acting and positive handling mechanism.

In preferred embodiments, each item holder is configured to reduce the pressure within the respective at least one port by creation and use of the Venturi effect within the item holder. As each item holder is configured to generate low pressure locally using the Venturi effect, this significantly reduces the time taken to obtain a sufficient level of vacuum and grip on an item. The volume to be evacuated within the item holder may be relatively small and so a partial vacuum can be developed relatively quickly.

Also, as the partial vacuum is only developed within the item holder (as opposed to use of a remote, shared pump for example, which the item holder moves relative to), a Venturi vacuum generator in the item holder may be fluidically coupled to an item engaging portion or component (such as a suction cup) of the item holder substantially (and preferably only) by an inflexible coupling arrangement, such as an internal conduit defined by a solid body of the item holder.

In known configurations, a vacuum pump is often provided at the end of long lengths of tubing. It can take a significant period of time to reduce the pressure sufficiently along the length of the tube to build-up a vacuum pull on an item, as the pump needs to displace air from the large volume within the tubing. Also the tubing tends to be formed of flexible material and contraction of the tubing slows the pressure reduction in the tubing. In applications involving a high throughput of items, any reduction in the time taken for operation of the gripper device is highly valuable.

With low pressure formed using the Venturi effect within each item holder, if an item is not picked up by a particular item holder or is dropped by a holder in transit, the vacuum pull exerted by the other item holders is not affected. Thus, the grip exerted by each item holder is independent of the others. This is an advantage over known configurations in which a pump or vacuum chamber is coupled to multiple item holders. Such an arrangement may rely on all the item holders successfully gripping a product in order to maintain a sufficient holding force. Loss of one or more items could result in all of the items initially held by a gripper being dropped.

Each item holder may have a pressurised gas inlet for coupling to a supply of pressurised gas (such as compressed air), and a Venturi effect generator fluidically coupled to the pressurised gas inlet and the at least one port.

Preferably, each item holder includes a gas outlet for pressurised gas and a flow diversion arrangement for diverting at least some of the gas flow to the gas outlet to flow instead to the at least one port. In this way, the same supply of pressurised gas may be used not only to create a gripping force, but also to eject an item from the respective holder by blowing it away from the holder. Instead of simply removing the gripping force, diverting the pressurised gas to eject the sausage achieves a positive rejection action and more reliable item ejection.

In embodiments, the flow diversion arrangement may comprise a valve for selectively reducing the flow of gas out of the outlet or stopping gas from flowing out of the gas outlet, and the device is arranged such that this causes gas to be diverted to the at least one port. The flow diversion valve itself may be operable using pressurised gas. This avoids the needs for electrical connections to the item holder to actuate the valve. This in turn means that the item holder may be fabricated without the use of electrical components, making it easier to clean, for example by submersion in cleaning fluids.

The at least one port may be defined by a resiliently flexible member which comprises a bellows-like body portion arranged such that the member is resiliently compressible in an axial direction. Each resiliently flexible member may be located within a cavity having sidewalls defined by the device and dimensioned such that when the respective resiliently flexible member is compressed in the axial direction causing the diameter of the bellows to increase, the resiliently flexible member is constrained against lateral movement by the sidewalls of the cavity. Compression of a resiliently flexible member may bring its outer circumferential surface into contact with adjacent walls defined by the item holder.

In a second aspect of the invention a method is provided of picking up and moving side by side arranged items, from a first position where the items are arranged in a side by side arrangement, to a second position where the items are released, using a gripper device according to any of the preceding claims, the method comprising:
- picking up the side by side arranged items, the arrangement of the spaced apart item holders initially being such that the pitch distance between adjacent item holders, prior to picking up the items, is substantially the same as the pitch distance between adjacent items at the first position, and
- adjusting the pitch distance between adjacent spaced apart item holders so as to arrange the received items into at least one group of items before the at least one group is released at the second position.

Thus, a method is provided that enhances the throughput of portions of items, e.g. portions of sausages, since the method allows making one or two or more portions with the gripper device simultaneously.

In one embodiment, the items are sausages and releasing the items within the at least one group as a group of items at the second position generates simultaneously at least one group of sausages at the second position. The release or simultaneous release of the at least one group of sausages at the second position includes in one embodiment releasing the at least one group of sausages into at least one tray or packaging receptacle, each tray or packaging receptacle carrying a single group.

As already addressed, the items may be any type of meat product, such as chicken breasts, and the products may be placed into a receptacle at the second position such that the pitch distance between adjacent products is increased compared to the pitch distance at the first position.

In one embodiment, at the second position a plurality of trays or packaging receptacles are advancing during the releasing of the at least one group of items into the trays or packaging receptacles. Thus, a highly productive packing process is provided where trays or packaging receptacles, each having a fixed portion of e.g. five items, may simultaneously be advanced into a packing facility where the portions are sealed with e.g. plastic films.

In one embodiment, the side by side arranged items at the first position are supported in a plurality of side by side arranged suitably shaped grooves, where each groove carries a single item or two or more items aligned along a longitudinal axis of the grooves. The items may be supported in the suitable shaped grooves and may be advancing while being picked up. The suitably shaped grooves may in one embodiment be an integral part of a conveyor belt.

The suitably shaped grooves may in one embodiment be a V- or U-shape.

In one embodiment, the incoming side by side arranged items are lying on a flat conveyor belt of a conveyor apparatus that preferably conveys the items while being picked up at the first position. Thus, if the items are e.g. food items such as sausages, chicken breasts etc., these items may be lying in a side by side arrangement on the flat conveyor belt that conveys them.

In a third aspect of the invention a packing system is provided for picking up side by side arranged items, such as sausages, at a first position where the items are arranged in a side by side arrangement, releasing the items into trays at a second position, where the robotic operated packing system comprises:

a gripper device as described herein, and
a receptacle supply,
wherein the gripper device is operable to release the at least one group of items into at least one receptacle from the receptacle supply.

In one embodiment, the receptacle supply comprises a conveyor arrangement for conveying spaced apart receptacles while the simultaneous release of the at least one group of items into the trays is taking place.

In one embodiment, the packing system further comprises a packing station for receiving the receptacles containing a group of items.

In one embodiment, the packing system further comprises an infeed station comprising a conveyor means, where the conveyor means comprises either a pre-shaped conveyor belt having a plurality of spaced apart suitably shaped grooves in which each individual item is supported while being conveyed, or a flat conveyor belt on which the side by side arranged items are resting. As already addressed, the spaced apart suitably shaped grooves may include V- or U-shaped grooves.

The term side by side arrangement may be understood as an arrangement where the items, and/or the item holders, and/or the suitably shaped grooves, are arranged parallel to each other where their longitudinal axes are substantially straight and parallel.

The term side by side arrangement may be also be understood as an arrangement where the items, and/or the item holders, and/or the suitably shaped grooves, do not have a straight longitudinal axis.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
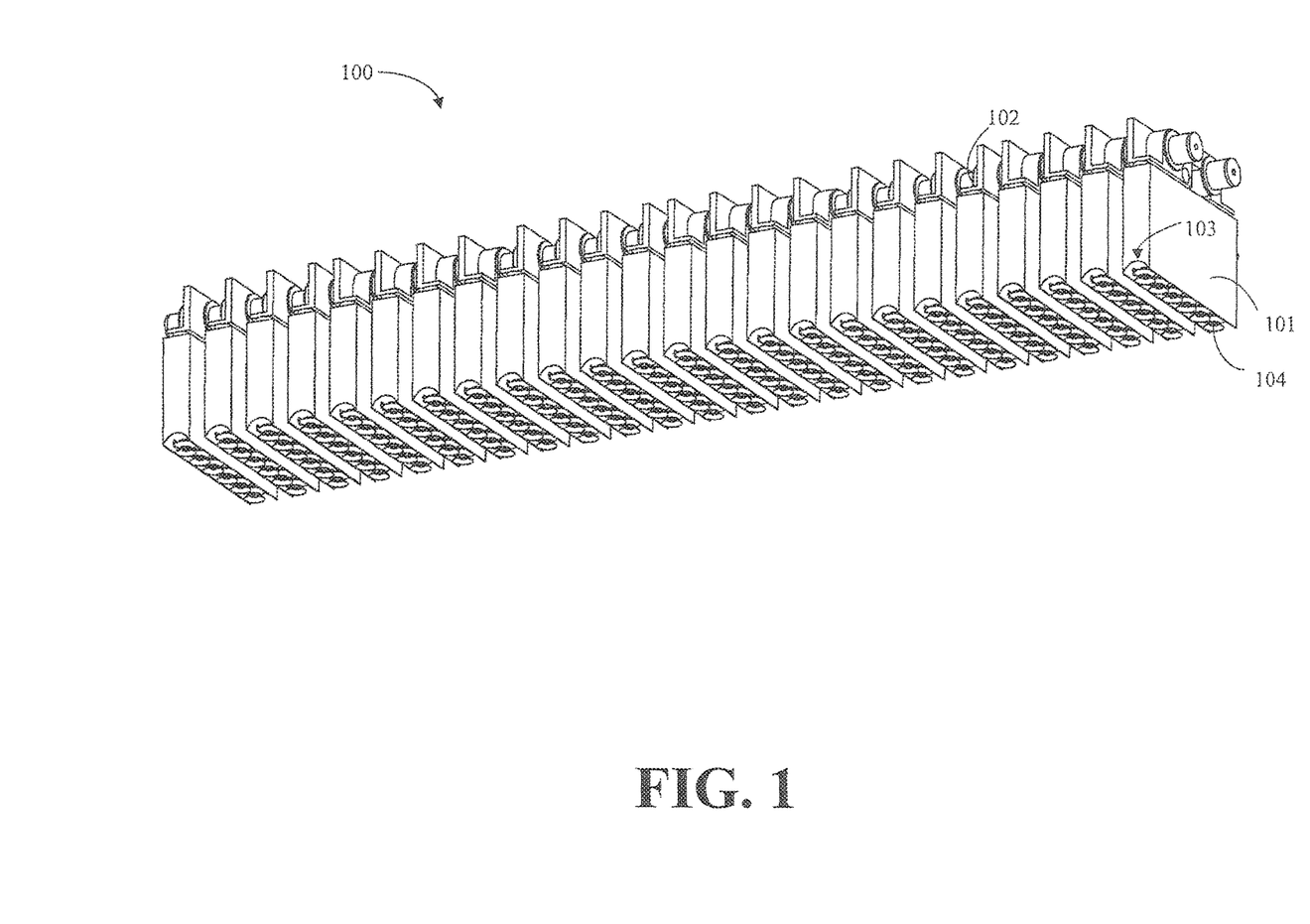
FIG. 1 shows a perspective view of a gripper device according to the present invention.

FIG. 1 shows a perspective view of a gripper device 100 according to an embodiment of the present invention. It is adapted to be attached to a system (not shown) that operates and moves the gripper device 100. The gripper device is adapted to receive and move side by side arranged elongated items (not shown) that may have a substantially circular cross-section, such as sausages, from a first position where the items are arranged in a parallel arrangement, to a second position where the items are released.

The gripper device is suitable for use in an automated packing system. It may be moved from one location to another by a moving mechanism under automated control. The moving mechanism may comprise a robot arm or another form of mechanised carrying arrangement.

The gripper device 100 comprises plurality of parallel arranged and spaced apart item holders 101 and a pitch distance adjustment mechanism 102. In the embodiment shown here the number of item holders is 24, but this number could just as well be less than 24 or more than 24.

The underside of each of the item holders may define item engaging surfaces which may have a cross-section 103 that is adapted to the shape of the items to be picked up, e.g. if the items are sausages it would be preferred that the cross-section 103 has a concave-like cross-section 103. The item holders 101 comprise a means for picking up the items, such as a suction mechanism 104, which may include one or more nozzle-like suction tubes arranged along the item holders 101 at the sides facing the items to be picked up.

As will be discussed in more detail later in relation to FIGS. 2-8, the pitch distance adjustment mechanism is adapted to, subsequent to picking up the items from the first position, adjust the pitch distance between adjacent spaced apart item holders so as to arrange the received items into at least one group of items, and wherein within each of the at least one group of items the pitch distance is reduced or increased, and wherein the items within the at least one group are released at the second position.

Figure 2A:
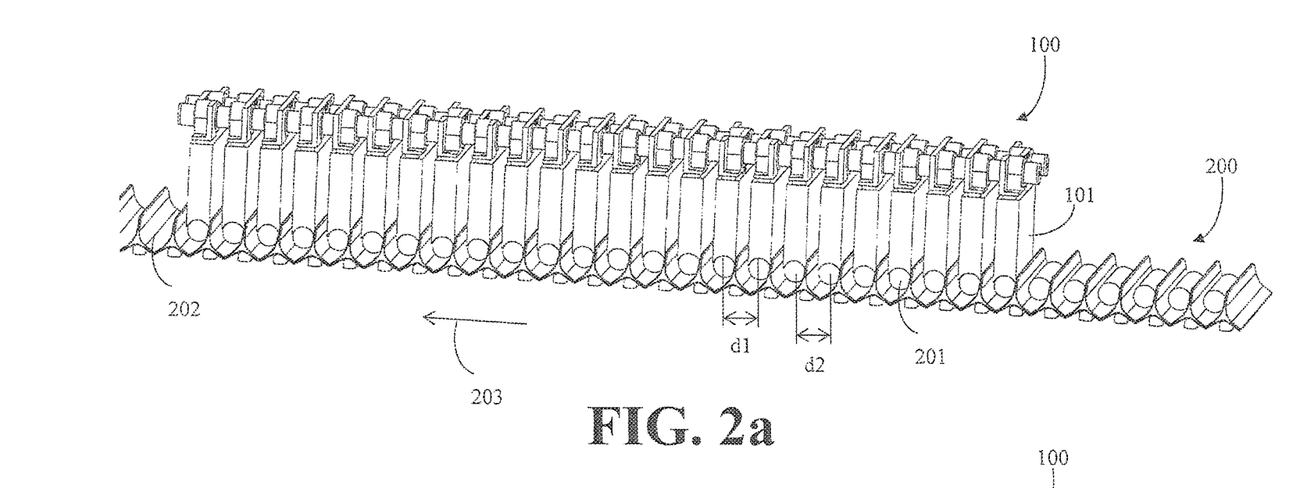
FIGS. 2-8 shows an example of an operation of the gripper device in FIG. 1 where plurality of parallel arranged items are picked up at a first position and put into separate trays at a second position.
Figure 2B:
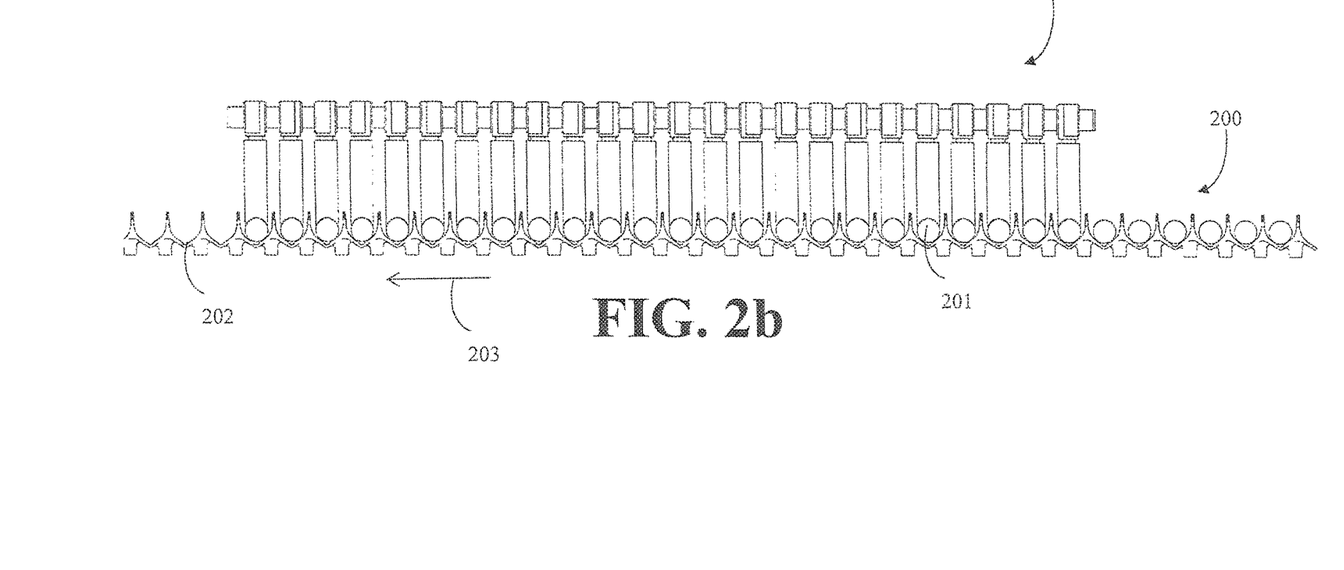

FIG. 2a,b shows a perspective view and a front view of the gripper device 100 shown in FIG. 1, showing where the initial arrangement of the item holders 100 is adjusted by the pitch distance adjustment mechanism such that the pitch distance d1 between adjacent item holders is substantially the same as the pitch distance d2 between adjacent items, in this case adjacent sausages 201. In that way, as depicted here, each item holder engages with a single item and subsequently the suction mechanism supplying an attraction force via suction by the plurality of nozzle-like suction tubes.

In one embodiment, two or more items may be picked up within one and the same item holder if the items are arranged in front of each other within the same item holder 202, i.e. along the longitudinal axis of the item holders.

In the embodiment shown here, an infeed station 200 is provided comprising a conveyor means 200 including pre-shaped conveyor belt 202 having plurality spaced apart grooves 202, as shown in this embodiment the grooves are V- or U-shaped grooves, into which each individual item selected from the the incoming items are supported while being conveyed as indicated by an arrow 203. The conveyor belt may instead be a flat conveyor belt.

Figure 3A:
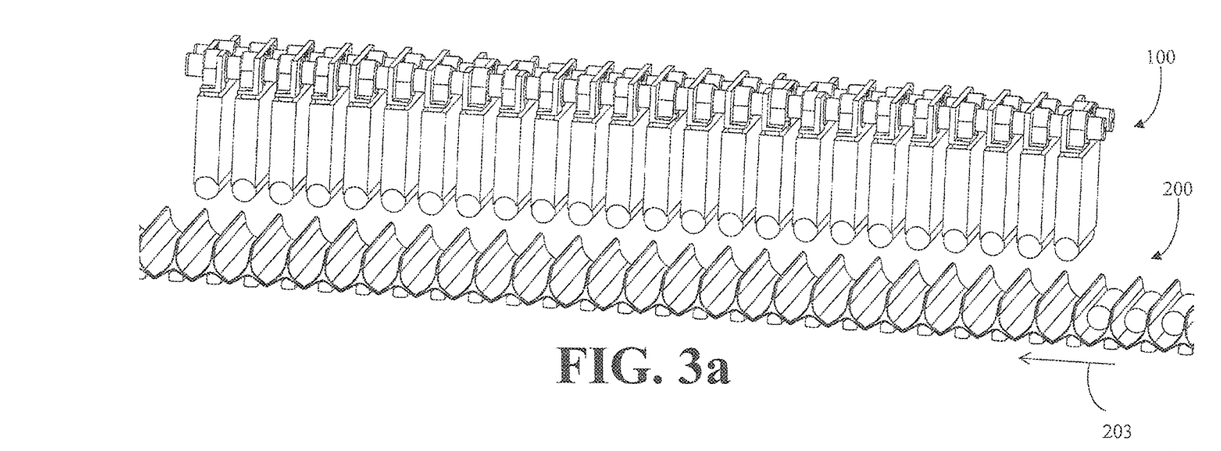
Figure 3B:
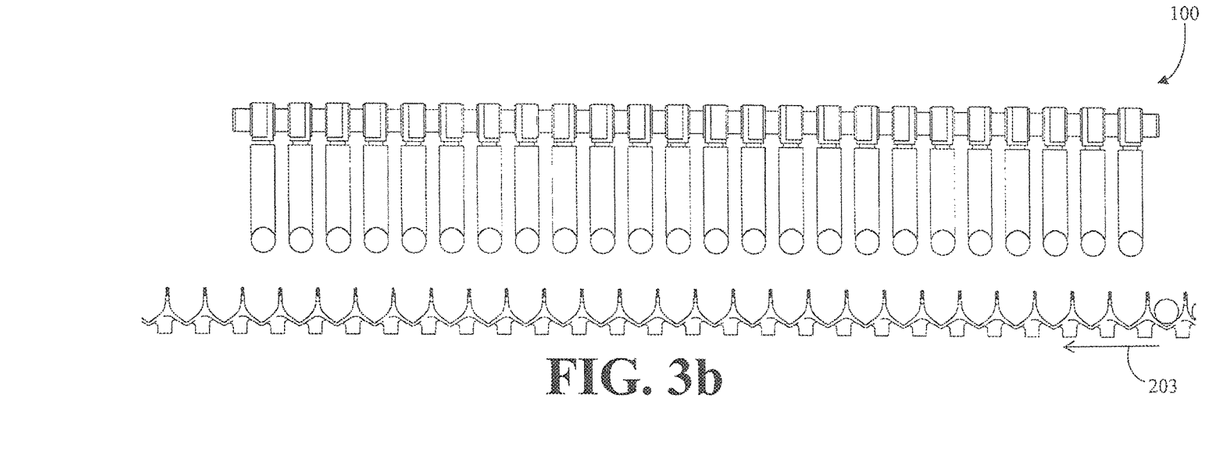

FIG. 3a,b depicts the scenario where the gripper device 100 picks up 24 items (e.g. sausages) simultaneously from the first position, i.e. from the infeed station 200.

Figure 4A:
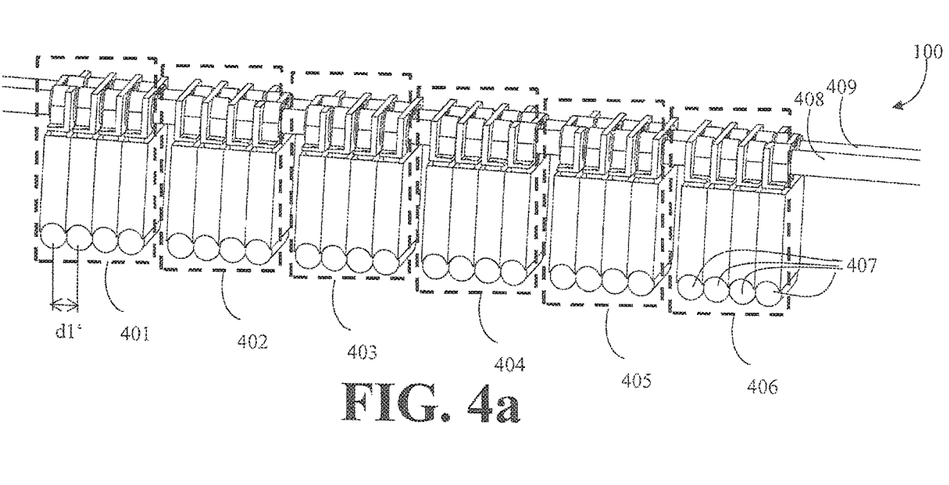
Figure 4B:
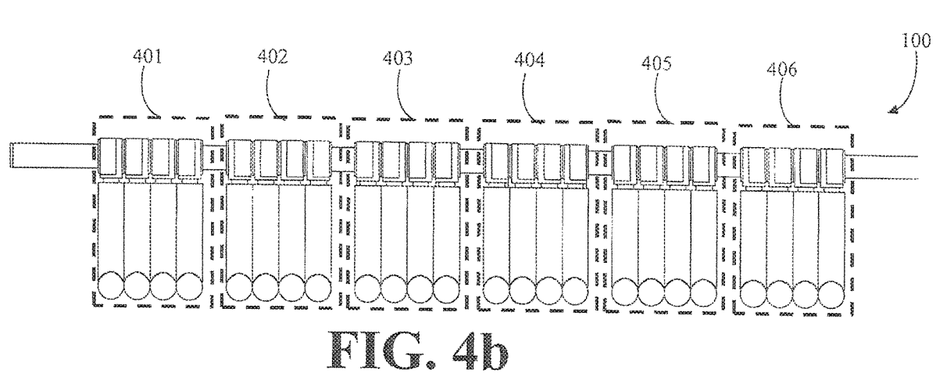

FIG. 4a,b shows where the pitch distance adjustment mechanism adjusts the pitch distance between adjacent spaced apart elongated item holders and arranges the received items into six groups of items 401-406. Within each of the at least one group of items the pitch distance is reduced from d1 to d1', where d1'<d1, such that the item holders within each group move closer together such that the items within each group 407 form a single group. In this case, the group shown is four sausages, but the group could of course be different from four.

The pitch distance adjustment may be operated by a robotic system (not shown here) that may be pre-programmed where the number of items within each group may be defined, and the number of groups being produced simultaneously may be defined.

There are several ways of performing such a pitch adjustment which are well known to a person skilled in the art. As an example, this embodiment may utilize 2 pneumatic cylinders, one for each of the 2 different functions.

The first cylinder may be connected to a group of product holders in a mechanical means, by which when the cylinder extends the holders are apart from each other. When the cylinder retracts, the product holders close together to form the new 'pitch distance' between them. All of the product holders may be mounted onto 2 slide rails 408, 409, that they move upon, side-ways.

The second cylinder may act in a similar way, but only act on the distance between groups or portions of sausages.

Figure 5A:
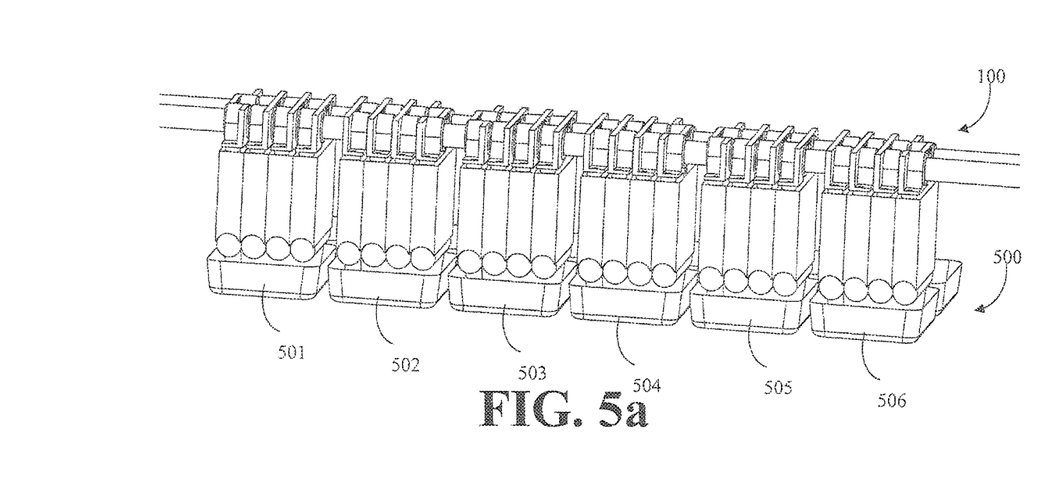
Figure 5B:
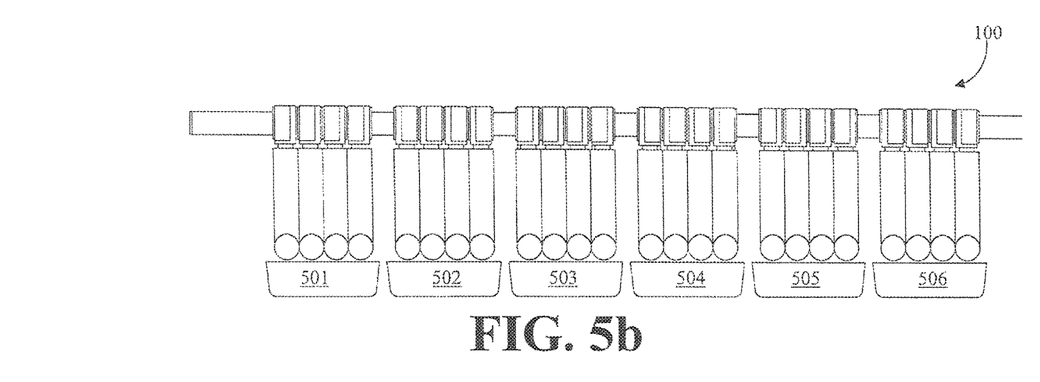
Figure 6A:
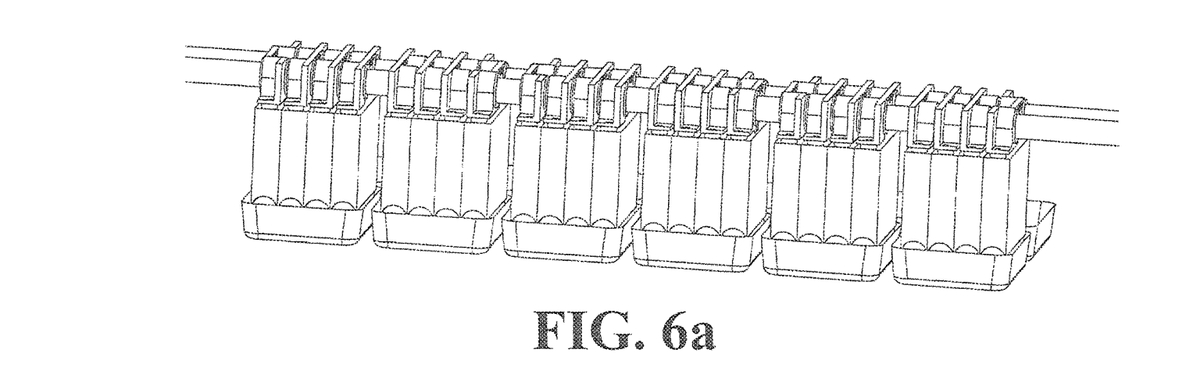
Figure 6B:
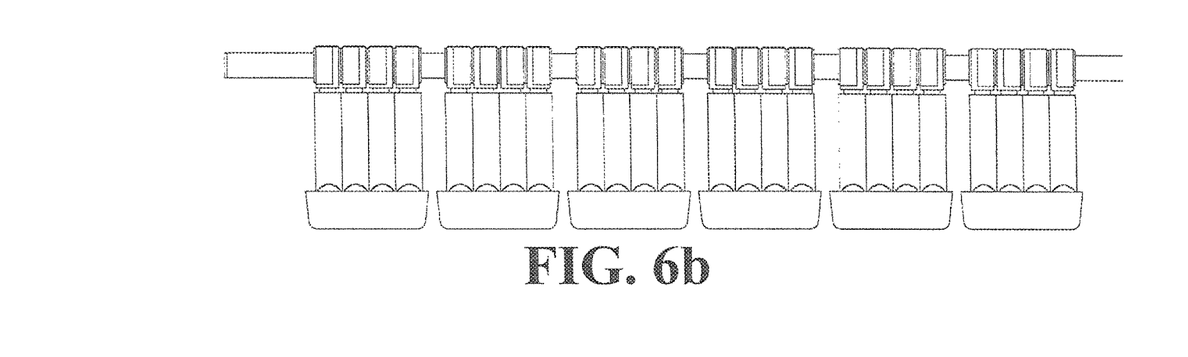

FIGS. 5a,b-6a,b show where the gripper device 100 has moved from the first position, i.e. the infeed station, to a second position, which in this embodiment is a receptacle supply in the form of a tray source facility 500, where the six groups of items are put into six different trays 501-506. These trays may be resting on a conveyor means (not shown) and may be advanced simultaneously to the step of releasing the six portions of items into the trays 501-506 by releasing the suction force.

Figure 7A:
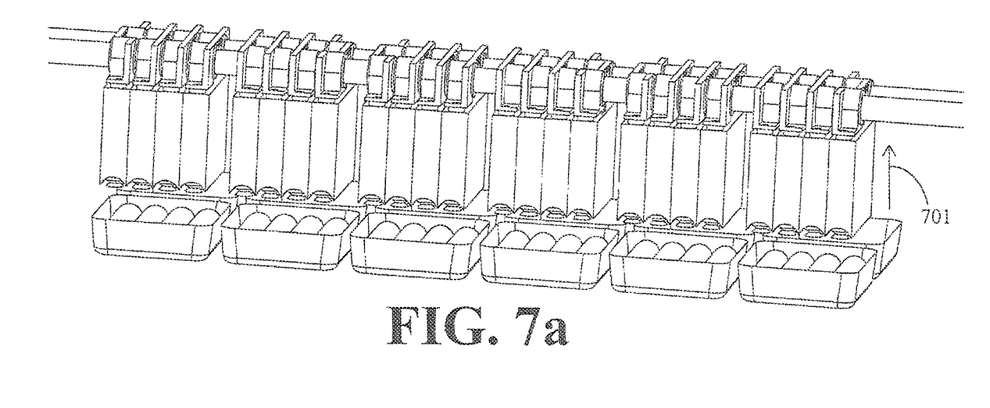
Figure 7B:
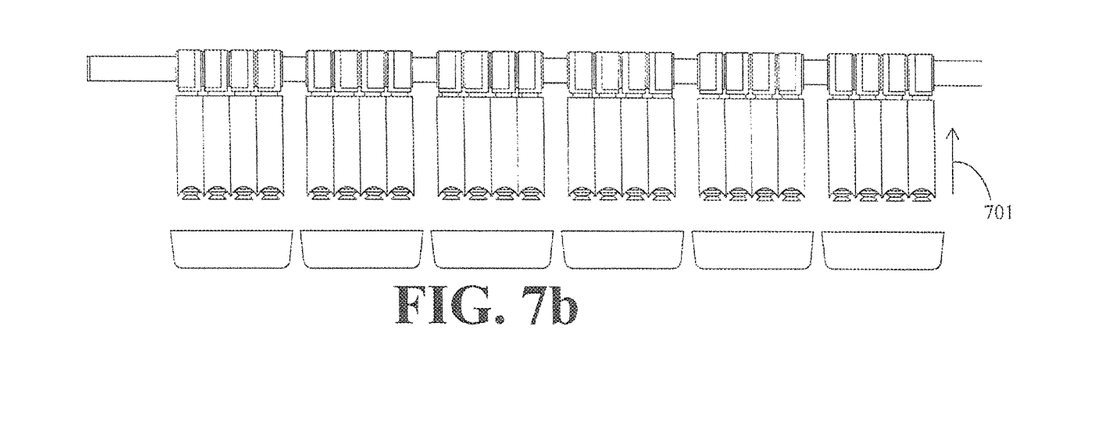
Figure 8A:
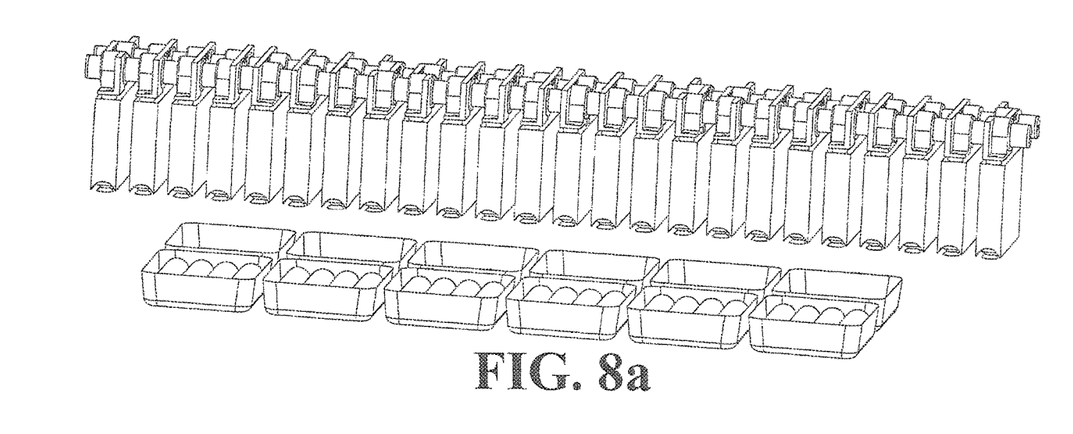
Figure 8B:
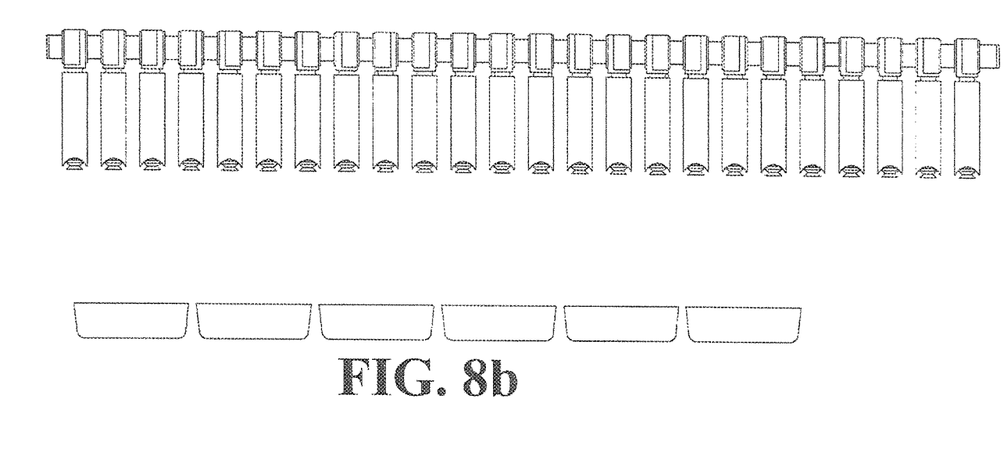

FIGS. 7a,b-8a,b show where the gripper device 100 moves subsequently in an upward direction as indicated by arrow 701 and the steps shown in FIGS. 2-7 are repeated.

The trays may subsequently be conveyed into a packing facility.

Figure 9:
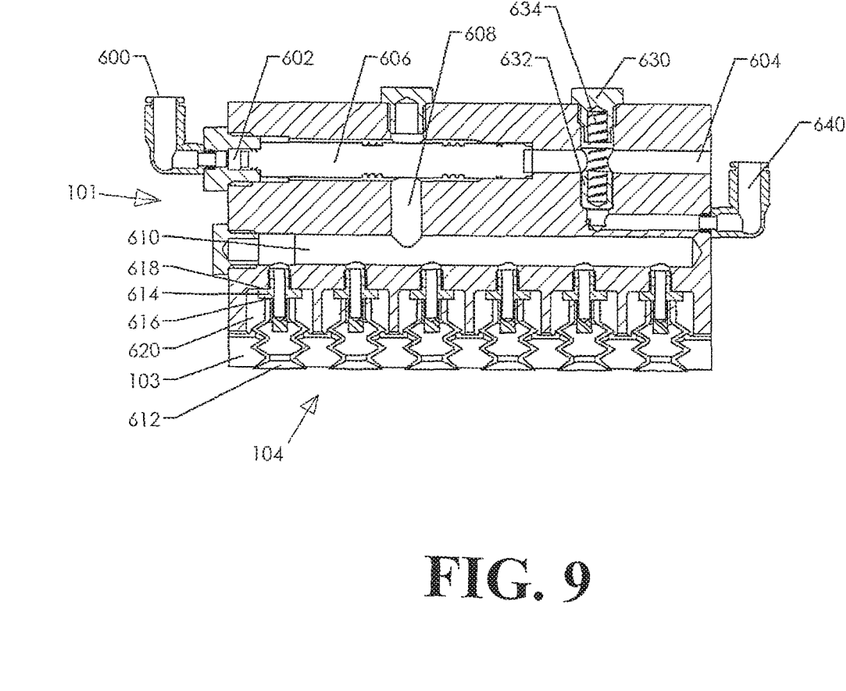
FIGS. 9 and 10 show cross-sectional views of an item holder of the gripper device shown in FIG. 1.
Figure 10:
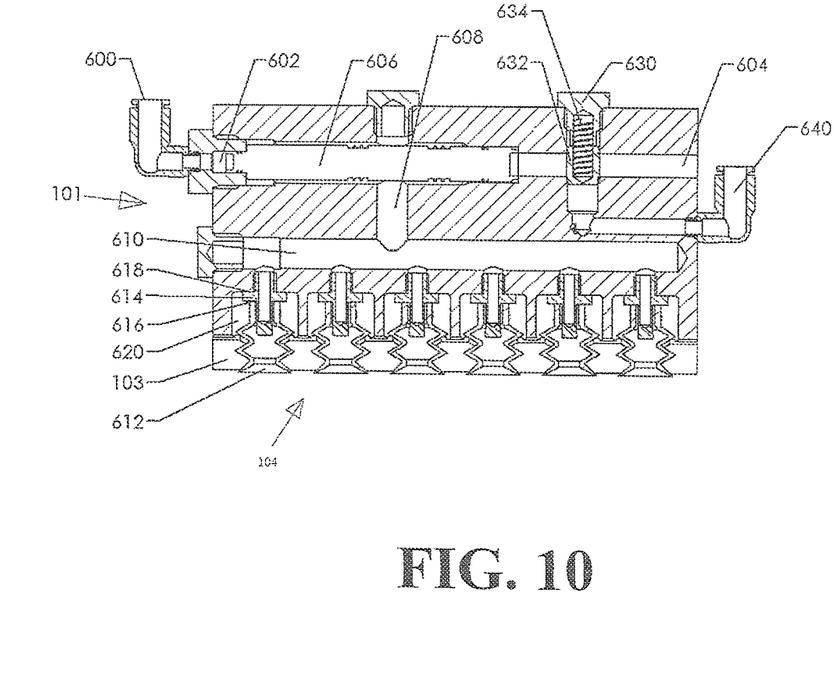

Cross-sectional side views of an item holder are shown in FIGS. 9 and 10. In FIG. 9, the item holder is arranged in a configuration for exerting a holding force on an item. In FIG. 10, the holder is configured to eject an item.

The item holder has an inlet 600 for connection to a supply of pressurised gas such as compressed air. The inlet is fluidically coupled to a conduit 602 which extends axially through the length of the item holder to an outlet 604 at the opposite end of the holder to the inlet 600.

Located within the conduit 604 is a Venturi vacuum generator 606. Although this is shown as a solid body in the schematic drawings, it will be appreciated that this generator does allow a path for gas to flow through it from one end to the other.

A connecting conduit 608 extends within the body of the item holder, from the conduit 604 to a vacuum chamber 610. It is fluidically coupled to the Venturi vacuum generator 606.

The chamber 610 is fluidically coupled to a set of six ports in this example, forming part of suction mechanism 104. The ports are in the form of resiliently flexible suction cups, made of silicon rubber for example. The distal portions of the ports have a bellows-like configuration so that they are compressible in an axial direction. The are press-fitted onto respective coupling members 614. Those coupling members define lower stop surfaces 616 for engagement with the suction cups and upper engagement surfaces 618 for engagement with the body of the item holder. Each coupling member defines a fluid path therethrough, thereby fluidically coupling the interior of the suction cup to the vacuum chamber 610.

Each suction cup is located via the coupling member within a respective cavity 620 defined by the body of the item holder. Each suction cup extends from the outer end of the cavity into the product engaging portion of the item holder. This portion of the item holder defines an elongate groove 103 which is adapted to the shape of the items to be picked up. In the embodiments shown in the drawings, the groove has an elongate configuration which is concave in transverse cross-section.

A valve 630 is disposed within the conduit 604, downstream of the vacuum generator 606. It includes a valve member 632 which is biased by a spring 634 into its open configuration as shown in FIG. 9. In this configuration, the valve member is substantially outside the fluid path through conduit 604.

The valve 630 is shown in its closed configuration in FIG. 10. Here, the valve member 632 has been moved upwards, against the biasing force exerted by spring 634, to a position where it blocks the conduit 604.

In the embodiment shown in the figures, the valve 630 is actuated by supplying pressurised air to pneumatic connection 640. This exerts a force on the planar end surface of the valve member 632 in opposition to the biasing force of spring 634.

Operation of the item holder will now be described with reference to FIGS. 9 and 10. When the gripper device has been moved to a first position over a plurality of items to be picked up, the pressurised gas supply to inlet 600 is turned on. At this stage, valve 630 is in its open configuration shown in FIG. 9. As a result of the airflow through the Venturi vacuum generator 606, the air pressure is quickly reduced in conduit 608, vacuum chamber 610 and within the ports 612.

The gripper device is then lowered so as to engage each item holder with a respective item or items. Initially, the outer ends of the suction cups engage the item. Due to their resilient and flexible construction, they are able to accommodate a degree of variation in the surface contours of the item to be picked up. The associated cavity 620 is also dimensioned to allow some flexing and shifting of the suction cups during pick-up.

As the gripper device moves further down onto the items to be picked up, they are also drawn upwardly towards the item holder by virtue of the partial vacuum formed within the suction cups after the cups have been brought into contact with an item. These actions cause the suction cups to be axially compressed, allowing the item to come into contact with the engaging surface 103.

Due to the bellows-like configuration on the suction cups, as they compress, their diameter increases. The cavities 620 are dimensioned so that the suction cups in their compressed configuration are close to or in contact with the sidewalls of the cavity. This restrains the suction cups against lateral movement. This is particularly desirable when the gripper device may be subjected to considerable accelerations during movement of the items from one position to another.

During movement of the gripper device, a suction force is maintained on the item held by the item holder.

When the item holder has moved to the position where the item is to be ejected, pressurised gas is applied to the pneumatic connector 640, moving the valve 630 to the closed configuration shown in FIG. 10. This causes the flow of air from inlet 600 to be diverted from its path to outlet 604. Instead, air from inlet 600 flows along connecting conduit 608 and into the ports defined by six suction cups 612.

This quickly removes the suction force on the items and instead exerts an ejection force, away from the item holder. This provides a quick and positive ejection action. This is significantly quicker and more reliable than existing configurations where it is necessary to wait for an applied vacuum to disperse, the item to break free of the gripper and then rely on gravity to cause the item to drop away from the gripper. The time taken for this will be considerable and also vary depending on various factors such as the temperature of the item, its surface finish, the amount of moisture on its surface and the effectiveness of the seal between the item and the gripper.

It will be appreciated that reference herein to components which are "fluidically coupled" together refers to the components being coupled together in such a way that a fluid path is defined between the components, with the fluid being a gas in the embodiments described.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A gripper device for picking up items from a first position wherein the items are arranged in a side by side arrangement; and releasing the items at a second position, wherein the gripper device comprises:
a plurality of side by side arranged and spaced apart item holders, wherein each of the item holders comprises a pick-up arrangement for picking up an item, the spaced apart item holders being configured such that the pitch distance between adjacent item holders, prior to picking up the items, is the same as the pitch distance between adjacent items at the first position, and
a pitch distance adjustment mechanism adapted to, subsequent to picking up the items from the first position, adjust the pitch distance between adjacent spaced apart item holders so as to arrange the received items into at least one group of items by altering the pitch distance within each of the at least one group of items before the at least one group is released at the second position, wherein the underside of each item holder defines an elongate groove for engaging with an item.

2. The gripper device according to claim 1, wherein the pick-up arrangement comprises a suction mechanism with a plurality of suction cups for supplying an attraction force on the items to be picked up.

3. The gripper device according to claim 1, wherein the device is configured to use the Venturi effect to reduce the pressure within at least one port defined by the pick-up arrangement, the at least one port being used to pick up an item, wherein each item holder includes a gas outlet for pressurized gas and a flow diversion arrangement for diverting at least some of the gas flow to the gas outlet to flow instead to the at least one port, and wherein the Venturi effect generator is fluidically coupled to the gas outlet, and the flow diversion arrangement is located in a fluid path defined between the Venturi effect generator and the gas outlet.

4. A method of picking up and moving side by side arranged items from a first position, wherein the items are arranged in a side by side arrangement to a second position, wherein the items are released using a gripper device, the method comprising:
picking up the side by side arranged items, the arrangement of the spaced apart item holders initially being such that the pitch distance between adjacent item holders, prior to picking up the items, is the same as the pitch distance between adjacent items at the first position, and
adjusting the pitch distance between adjacent spaced apart item holders so as to arrange the received items into at least one group of items before the at least one group is released at the second position.

5. The method according to claim 4, wherein the items are sausages and the method includes releasing the items within the at least one group as a group of items at the second position to generate at least one group of sausages at the second position.

6. The method according to claim 5, wherein the release of the at least one group of sausages at the second position comprises releasing the at least one group of sausages into at least one tray or packaging receptacle, each tray or packaging receptacle carrying a single group.

7. The method according to claim 3, wherein two or more groups of items are produced simultaneously.

8. The method according claim 3, wherein at the second position a plurality of trays or packaging receptacles are advanced during the releasing of the at least one group of sausages into the trays or packaging receptacles.

9. The method according to claim 4, wherein the items supported in the grooves are advanced while being picked up.

10. The method according to claim 4, wherein the grooves are an integral part of a conveyor belt.

11. A robotic operated packing system for picking up side by side arranged items, such as sausages, at a first position, wherein the items are arranged in a side by side arrangement and placed into trays at a second position, wherein the robotic operated packing system comprises:
a gripper device, wherein the gripper device comprises:
a plurality of side by side arranged and spaced apart item holders, each of the item holders being adapted to the shape of the items, wherein each of the item holders comprises a means for picking up the side by side arranged items, the internal arrangement of the spaced apart item holders being such that the pitch distance between adjacent item holders, prior to picking up the items, is the same as the pitch distance between adjacent items at the first position, a pitch distance adjustment mechanism adapted to, subsequent to picking up the items from the first position, adjust the pitch distance between adjacent spaced apart item holders so as to arrange the received items into at least one group of items, and wherein within each of the at least one group of items the pitch distance is altered, and a tray source facility at a second end, wherein the gripper de vice is operated such that lest one group of items is released into at least one tray at or next to the tray source facility.

12. The robotic operated packing system according to claim 11, wherein the tray source facility at the second end comprises a conveyor means for conveying spaced apart trays while the simultaneous release of the at least one group of items into the trays is taking place, and a packing station for receiving the trays containing a group of items and packing individual trays by a packing material.

13. The robotic operated packing system according to claim 11, further comprising an infeed station comprising a conveyor means, wherein the conveyor means comprises either a pre-shaped conveyor belt having a plurality of suitable shaped grooves into which each individual item is supported while being conveyed, or a flat conveyor belt on which the side by side arranged items are resting.

14. The robotic operated packing system according to claim 11, wherein the means for picking the side by side items comprises a suction mechanism with a plurality of suction cups for supplying an attraction force on the items to be picked up.

15. The robotic operated packing system according to claim 11, wherein the device is configured to use the Venturi effect to reduce the pressure within at least one port defined by the means for picking up the side by side arranged items, the at least one port being used to pick up an item, wherein each item holder includes a gas outlet for pressurized gas and a flow diversion arrangement for diverting at least some of the gas flow to the gas outlet to flow instead to the at least one port, and wherein the Venturi effect generator is fluidically coupled to the gas outlet, and the flow diversion arrangement is located in a fluid path defined between the Venturi effect generator and the gas outlet.

* * * * *